T. NEYS.
MACHINE FOR EDGING SHINGLES.
No. 174,557.  Patented March 7, 1876.
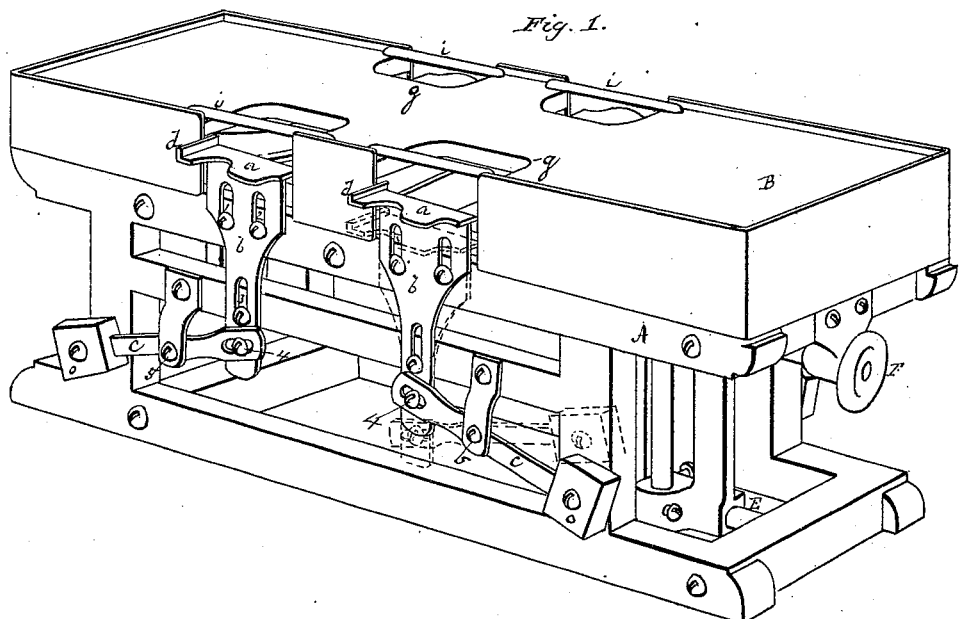
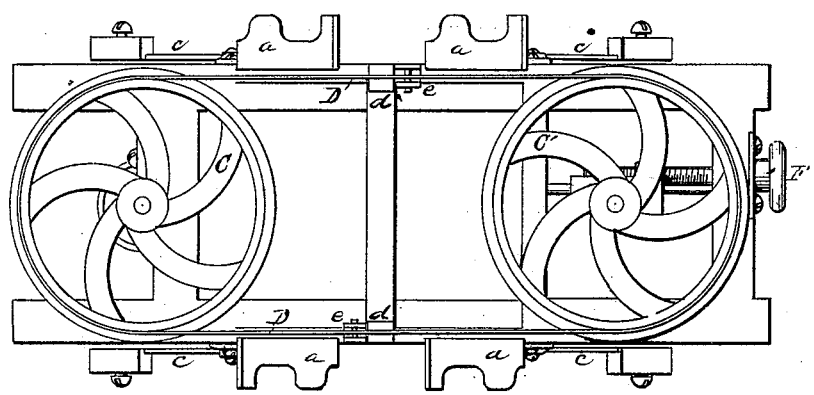
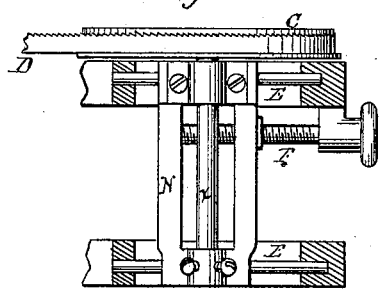
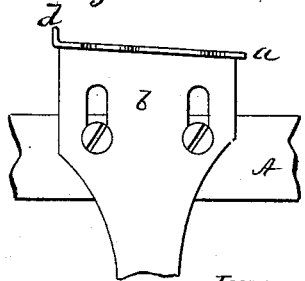
Witnesses:
C. Clarence Poole
Will H. Moron
Inventor:
Theodor Neys
per Atty. A. H. Evans & Co.

UNITED STATES PATENT OFFICE.

THEODOR NEYS, OF MENOMONEE, WISCONSIN, ASSIGNOR OF ONE-HALF HIS RIGHT TO A. J. BRUNELLE, OF SAME PLACE.

IMPROVEMENT IN MACHINES FOR EDGING SHINGLES.

Specification forming part of Letters Patent No. 174,557, dated March 7, 1876; application filed February 8, 1876.

*To all whom it may concern:*

Be it known that I, THEODOR NEYS, of Menomonee, in the county of Dunn and State of Wisconsin, have invented certain Improvements in Machines for Edging Shingles; and I hereby declare the following to be a full, clear, and exact description thereof, reference being had to the accompanying drawings making part of this specification, in which—

Figure 1 is a perspective view of the machine. Fig. 2 is a plan view with the table removed. Figs. 3 and 4 are details to be referred to.

The object of my invention is to edge shingles with rapidity; and it consists in a horizontal band-saw, used in combination with other devices, as hereinafter more fully described and claimed.

In the said drawings, A A is the framework, and B the table, which covers a band-saw, D, running on pulleys C C'. The arbor $x$ of the pulley C' is journaled in a frame, N, which slides on rods E E, and is controlled in its relation to the end of the frame A by a screw, F, in order to allow the use of saws of different lengths. The table B is cut away, as seen at $g\ g$, to expose the saw at various points, as may be desired. Over each of these openings $g\ g$ is arranged a guard, $i$, to prevent anything from falling upon the saw. Below each opening $g$ is a supplemental table, $a$, as seen in Fig. 4. The table $a$ is slightly inclined downward from the rib $d$, and rests upon a vertical plate, $b$, provided with slots 1 2 3, through which screws fasten it to the table-frame A, allowing the plate $b$ a vertical movement in proportion to the length of the slots. Engaging with a stud, 4, in the lower end of the plate $b$ is a slotted lever, $c$, pivoted at 5, and having on its end a weight, $o$, which serves to keep the plate $b$ forced up against the screws which hold it to the table.

In jointing the shingles they are laid singly on the table $a$, with their butts against the rib $d$, the table $a$ depressed until the saw strikes the shingle and saws the edge smooth and parallel to the edge previously sawed. The incline from the rib $d$ requires the saw to catch the edge of the shingle first and hold it, making a gradual cut, instead of striking the entire surface at once and throwing the shingle off.

Guides $e$, with adjustable pins or screws, serve to control the lateral vibrations of the saws. Guiding-supports $d'$ support and limit the vertical vibration of the saws.

Having thus described my invention, what I claim as new, and desire to secure by Letters Patent, is—

1. The movable horizontal table $a$, inclined from the rib $d$, vertical slotted plate $b$, and weighted lever $c$, in combination with the frame A and horizontal band-saw D, substantially as and for the purpose described.

2. The vertical reciprocating shingle-carrying tables $a\ a$, in combination with the band-saw D and removable table B, all constructed, arranged, and operated as set forth.

THEODOR NEYS.

Witnesses:
R. C. BIERCE,
CARROLL LUCAS.